US006608117B1

(12) United States Patent
Gvozdic

(10) Patent No.: US 6,608,117 B1
(45) Date of Patent: Aug. 19, 2003

(54) METHODS FOR THE PREPARATION OF CELLULAR HYDROGELS

(75) Inventor: Nedeljko Vladimira Gvozdic, Gainesville, FL (US)

(73) Assignee: Nanosystems Research Inc., Alachua, FL (US)

( * ) Notice: Subject to any disclaimer, the term of this patent is extended or adjusted under 35 U.S.C. 154(b) by 76 days.

(21) Appl. No.: 09/853,517

(22) Filed: May 11, 2001

(51) Int. Cl.[7] .............................. C08J 9/26; C08J 9/28; B29C 65/00
(52) U.S. Cl. ........................... 521/141; 521/61; 521/64; 264/41; 264/42
(58) Field of Search ........................... 521/64, 61, 141; 264/41, 42

(56) References Cited

U.S. PATENT DOCUMENTS

| | | |
|---|---|---|
| 2,609,347 A | 9/1952 | Wilson |
| 2,668,153 A | 2/1954 | Hammon |
| 2,825,747 A | 3/1958 | Rogers et al. |
| 4,073,733 A | 2/1978 | Yamauchi et al. |
| 4,083,906 A | 4/1978 | Schindler et al. |
| 4,098,728 A | 7/1978 | Rosenblatt |
| 4,279,752 A | 7/1981 | Sueoka et al. |
| 4,430,447 A | 2/1984 | Pospich et al. |
| 4,644,014 A | 2/1987 | Thomson et al. |
| 4,663,358 A | 5/1987 | Hyon et al. |
| 4,734,097 A | 3/1988 | Tanabe et al. |
| 5,071,648 A | 12/1991 | Rosenblatt |
| 5,147,344 A | 9/1992 | Sachau et al. |
| 5,494,940 A | 2/1996 | Unger et al. |
| 5,502,082 A | 3/1996 | Unger et al. |
| 5,541,234 A | 7/1996 | Unger et al. |
| 5,554,658 A | 9/1996 | Rosenblatt |
| 5,554,659 A | 9/1996 | Rosenblatt |
| 5,573,994 A | 11/1996 | Kabra et al. |
| 5,744,150 A | 4/1998 | Cercone |
| 5,843,060 A | 12/1998 | Cercone |
| 5,928,665 A | 7/1999 | Cercone |

FOREIGN PATENT DOCUMENTS

| | | |
|---|---|---|
| DE | 2523287 | 12/1976 |
| JP | 55/071532 | 5/1980 |
| JP | 57/006403 | 2/1982 |
| JP | 62/072732 | 4/1987 |

*Primary Examiner*—Morton Foelak
(74) *Attorney, Agent, or Firm*—McKellar Stevens; Robert L. McKellar

(57) ABSTRACT

What is disclosed herein are physically cross-linked, cellular hydrogels and methods for their preparation. The cellular materials are highly resilient, hydrophilic materials having broad uses. The cellular materials are prepared by the physical crosslinking of frothed polymers and providing materials that have cellular pores provided by the use of removable materials during the formation of the cellular materials.

13 Claims, No Drawings

METHODS FOR THE PREPARATION OF CELLULAR HYDROGELS

The invention disclosed herein deals in one embodiment with cellular hydrogels and methods for their preparation. The hydrogels of this invention can be colored, rendered radio opaque, or can be complexed, for example, with iodine and/or other germicides to yield useful materials.

The hydrogels can be formed into essentially any shape, size, or surface texture, and can have a wide range of desired degrees of porosity, that is, have any pore size, or pore geometry, or any pore size/geometry distribution.

The methods for preparing the hydrogels require dissolution of the precursor polymers in either single or mixed solvents capable of dissolving the polymer. The polymer solution is then loaded with a material (described infra) that creates the continuous polymer network structure with the embedded material. The mixture is then subjected to conditions that cause crystallization, gellation, or coagulation, or a mixture of crystallization, gellation, or coagulation, of the polymer through formation of physical sites. Thereafter, the material is removed to provide a cellular hydrogel.

The cellular hydrogels can then be subjected to a solvent treatment and/or a heat treatment to modify and further tailor the physical properties.

In an alternative method, the polymer is first dissolved in a solvent for the polyvinyl alcohol (PVA), or a mixture of solvents for the PVA, and a stable froth is prepared through the use of surface active agents or a mixture of surface active agents. The froth is then subjected to conditions that cause crystallization, gellation, coagulation or a mixture of crystallization, gellation, or coagulation, of the polymer through the formation of physical sites. The hydrogels formed in this manner can then be subjected to a solvent treatment or heat treatment to modify and further tailor the physical properties of the hydrogels.

BACKGROUND OF THE INVENTION

The published literature is abundant with references to various types of cellular materials made from polymers such as polyurethanes, polystyrenes, polyolefins, polyvinylchloride, epoxies, urea-form aldehyde, latices, silicones, fluoropolymers, and a number of other polymers. Numerous methods for the preparation and controlling the physical properties of cellular materials have been disclosed in the literature.

Manufacturing processes for making cellular polymers are well known to those skilled in the art with regard to bulk (solid) polymers. Typically, cellular polymers are made either by mechanically entrapping gas bubble in a polymer matrix or by incorporating removable, materials. Commonly, gas bubbles of nitrogen and carbon dioxide are mechanically entrapped either under normal atmospheric pressure or generated by sudden expansion of gas dissolved in the polymer matrix upon decrease of the pressure. Cellular structures can also be created by entrapping gas generated through a chemical reaction of an expansion agent or blowing agent. For instance, one can entrap carbon dioxide released during the chemical reaction of sodium bicarbonate and an acid. Usually, the chemical foaming methods are preferred over mechanical, that is, physical foaming methods. This is because, when physical foaming methods are used, it is, for instance, difficult to ensure homogeneous distribution of entrapped gas in the polymer matrix, control reduction of gas pressure, and control the diffusion rate of a gas out of the polymer matrix.

Those methods that have been reported in the literature for the preparation of PVA hydrogels can be divided into methods that rely on covalent cross-linking in one approach, and those methods that involve physical cross-linking.

The first method, covalent cross-linking, also known as chemical cross-linking, includes the use of multi-functional reactive molecules, that is, cross-linkers, such as aldehydes, maleic acid, dimethylurea, diisocyanates, boric acid and also includes ionizing radiation, ultra-violet, or any other agent capable of creating covalent cross-links between molecules. This method has been used to prepare bulk (non-porous) and cellular (porous) hydrogels.

The second, or alternative method, also known as physical or reversible cross-linking, includes cross-linking through crystallites, hydrogen bonding and complexing. Physical cross-linking through formation of crystallites in situ is the most desirable and can be accomplished by single freezing and then de-freezing; repeated freezing and de-freezing; partial or complete freeze-drying; controlled low temperature crystallization and the like.

A review of the prior art shows that physical cross-linking methods have been used only to prepare bulk hydrogels. No references related to the preparation of cellular hydrogels by physical cross-linking were found. The first of these references is U.S. Pat. No. 2,609,347, which issued to Wilson in 1952. This reference teaches the preparation of covalently cross-linked porous hydrogels by cross-linking the polymers with formaldehyde at temperatures between 20° C. and 60° C. in the presence of acid catalysts, such as sulfuric acid. The method is a frothing method, in that, porous structures are created by entrapping gas bubbles in the polymer solution in the presence of a wetting agent which stabilizes bubbles and helps to disperse the bubbles uniformly throughout. This patent also discloses the possibility of using cross-linked polymer hydrogels in a number of applications including the use as implants in the human body.

Since the publication of that patent, a number of methods, based on a covalent cross-linking of PVA as disclosed in the '347 patents have been reported for making cellular materials. In all cases of the prior art, the first step in the preparation of cellular hydrogels is dissolution of the polymer or its copolymers in an appropriate solvent, typically water. The next step is entrapment of air bubbles in the polymer solution in the presence of a surfactant and finally, cross-linking the polymer by treating it with di- or multi-functional cross-linkers.

All cross-linking agents used in the prior art render the sponges intractable and thus making them insoluble in any solvent due to formation of covalent bonds between molecules. Typically, cross-linking agents for the PVA were selected from the aldehyde family, such as formaldehyde, glyoxal, glutaraldehyde, terephthaldehyde and hexamethylenealdehyde that leads to formation of highly acetalized cellular PVA networks. PVA can also be cross-linked with unsaturated nitrites, di-diisocyanates, trimethylolmelamine, epichlorohydrin, polyacrylic acid, dimethylolurea, maleic anhydride, boric acid, sodium tetraboratedecahydrate (Borax) or by exposure to high-energy radiation.

Covalently cross-linked PVA sponges and bulk PVA hydrogels have a relatively long history of use in a wide variety of applications. Covalently cross-linked PVA sponges have already established themselves as very useful materials in numerous applications such as in packaging, thermal and acoustic insulation, construction, furniture, transportation, aerospace, food industry, household, textile, medical cosmetics and a number of other areas. For example, covalently cross-linked cellular PVA are used commercially as filters for water, air filters in intakes of compressors, engines, and air conditioners, oil filters, and the like. Large numbers of uses of PVA sponges are also based on their ability to readily absorb and hold water such as household washing sponges, absorbent cloths, industrial dehydrating rollers, paint rollers, acoustic filters, and the like.

The use of PVA sponges and PVA hydrogels in the medical field is especially important because of unique physico-chemical properties of PVA hydrogels. In spite of some incompatibility concerns and physical property limitations, acetalized PVA sponges have readily found significant use in medical fields such as, in cardio-vascular applications. Some of the important unique properties of acetalized PVA sponges are, for instance, being impervious to attack by body fluids such as, for example, blood, urine and other secretions; being non-sticking and non-adherent to tissue and having reasonably good biocompatibility.

The following patents disclose the use of PVA. For example, foams in cosmetics can be found in Japanese kokai 62/072,732 published in April of 1987 to Csawas; thermal insulation in U.S. Pat. No. 4,644,014 which issued to Thomson in February of 1987; pharmaceuticals in Japanese kokoku 57/006,403 which published in February of 1982; medical applications in German Patent 2,523,287 and finally, Japanese Patent 55/071,532 discloses water absorption.

Patents such as U.S. Pat. No. 2,609,347, U.S. Pat. No. 2,668,153, and U.S. Pat. No. 2, 825,747, teach a frothing process for the preparation of PVA sponges from concentrated, viscous aqueous solutions of PVA by cross-linking the PVA with formaldehyde. The solutions are typically vigorously mixed to incorporate gas bubbles into the PVA solutions that are then acidified at or above 60° C. to induce covalent cross-linking. This type of PVA sponge is commercially available from a number of sources, but the best-known brand name is Ivalon® from Unipoint Industries, High Point, N.C.

U.S. Pat. No. 4,098,728 teaches a frothing process to make uniformly expandable hydrophilic sponge by reacting PVA with formaldehyde in the presence of an inorganic acid and non-toxic wetting agent at temperatures of 30° C. to 60° C. After the PVA has been cross-linked, substantially all of the elutable acid, wetting agent, and formaldehyde are extracted from the sponge. This sponge is suitable for medical use and is characterized by instantaneous wicking and high liquid holding capacity. The rate of wicking and liquid holding capacity of these sponges is controlled by temperature and processing conditions during the formation and curing of reaction product in aqueous medium. This patent also discloses a method of making PVA sponge x-ray opaque by incorporating and homogeneously distributing throughout the PVA sponge, an encapsulated radio opaque substance.

Further, U.S. Pat. No. 4,430,447 discloses a frothing method for manufacturing molded articles from open pore PVA foam that has been covalently cross-linked with aliphatic aldehyde in the presence of wetting agent and acid. This invention also teaches preparation of open pore foams from a mixture of an aqueous PVA solution and an aqueous dispersion of a vinyl acetate/ethylene copolymer by frothing and cross-linking corresponding polymer networks with aliphatic aldehyde in the presence of an acid. Still further, U.S. Pat. Nos. 5,554,658 and 5,554,659 disclose a frothing process for making injection molded porous PVA sponge by reacting PVA with formaldehyde in the presence of a mineral acid, thickening agents and non-toxic wetting agents at temperatures of 50° C. to 95° C. Preferred degree of acetalization is at least 50% and preferably over 70%. It also teaches a method for making an outer skin on articles of molded PVA sponge.

Going still further, U.S. Pat. No. 5,843,060 discloses a frothing process for preparation of acetalized PVA foam that is useful for making non-adherent nasal, sinus and otic packings. Frothing aqueous solutions of PVA in the presence of wetting agents and gas produces acetalized PVA foam. Frothed PVA is then cross-linked with an organic compound containing two hydroxyl reactive groups in the presence of an inorganic acid catalyst.

Finally, U.S. Pat. No. 5,147,344 discloses a frothing process for preparation of PVA foams based on gelatin and water. The foam is stabilized by covalently cross-linking polymers with multi-function cross-linking agents selected from the group comprising at least trivalent metals or semi-metal or organic or inorganic acids or salts thereof. The foam optionally may contain plasticizers and/or auxiliary agents and/or additives.

With regard to pore-forming methods, one can note from U.S Pat. No. 4,083,906, that the preparation of PVA sponges by using polyethylene glycol and polyacrylamide having various molecular weights, as removable pore-forming substances is disclosed. PVA solution is first mixed with the pore-forming substance and then the PVA is cross-linked with aldehydes in the presence of acid. The pore-forming substance is practically inert to aldehyde reactions. Acid, and water soluble substances are washed out with water.

Another method is taught in U.S. Pat. No. 4,279,752, in which the use of fine silica particles as pore-forming substances in the manufacture of PVA sponges provides sponges with very fine pores. The coagulation of PVA having degrees of hydrolysis as low as 85% is carried out in the presence of an acid, base, or salt. Coagulation-causing substances and the solids are substantially extracted from coagulated PVA. Silica is extracted by alkali solutions such as lithium hydroxide, sodium hydroxide, potassium hydroxide and the like. This patent is limited to making PVA membranes with pore sizes from 50 angstroms to 10 $\mu$m.

U.S. Pat. No. 4,073,733 discloses the preparation of uniform, porous PVA membranes having micro pores made by a process comprising dissolving a polyoxyalkylene glycol into PVA aqueous solutions, coagulating the resulting solutions to form a membrane and removing the polyoxyalkylene glycol by extraction. The membranes obtained according to this invention have average pore sizes of 0.002 to 2 microns and show excellent performance in the separation of small particles.

In other methods of preparation there is shown in U.S. Pat. No. 5,494,940, U.S. Pat. No. 5,502,082, and U.S. Pat. No. 5,541,234, the preparation of highly porous PVA hydrogel bodies having high surface area and open cell structures and articles made from those polymers. The porosity in the hydrogels is created by a process that exposes a PVA solution to a gelling solvent and then gradually replaces that solvent with a cross-linking solvent using a concentration gradient solvent-exchange process. This process leads to coagulation of the PVA in the form of porous freestanding gels that afterward are covalently cross-linked with multi-functional cross-linking agents, preferably by diisocyanates.

U.S. Pat. No. 5,573,994 teaches a method for preparation of super absorbent, microporous foams comprising a cross-linked polymer having interconnected cells distributed throughout its body. The method requires that a cross-linkable polymer be first dissolved to form a stable solution.

This stable solution is induced to phase separate into polymer rich and polymer depleted phases and then the polymer is cross-linked to microporous structures. This foam is capable of having exceptionally rapid sorption rates.

U.S. Pat. No. 5,200,786 teaches a method of manufacturing hot water soluble towels, sponges and gauzes based on a PVA fiber structure. PVA fibers are soluble in aqueous solutions above approximately 93° C. The articles manufactured according to this invention are based on fabrics made from non-woven PVA fibers that have been either hydro entangled, thermo bonded or chemically bonded together. The articles of this invention are not typical sponges or foams but bonded or entangled fibrous bodies that perform functions typically associated with sponges and foams.

U.S. Pat. No. 4,663,358 that issued to Ikada deals with physically cross-linked PVA hydrogels.

U.S. Pat. No 4,098,728 discloses a method for incorporating into an acetalized PVA sponge, a radio opaque material such as barium sulfate at 6 to 12 weight percent.

U.S. Pat. No. 5,071,648 teaches a composition comprising complexes between acetalized PVA and iodine, useful in antimicrobial applications such as in controlling infection by releasing a desired amount of iodine as an antimicrobial agent. The articles made using this complex are useful in a number of applications, especially in wound dressings.

In other antimicrobial applications, U.S. Pat. Nos. 5,774,150 and 5,928,665 teach methods of preparation of an antimicrobial material by creating a complex between iodine and acetalized PVA foam. Acetalized PVA foam can also be impregnated with a polyol from water solution to create soft foam that will not dry in air nor will it become rigid. The impregnation with polyol has another advantage, that is, its presence accelerates formation of iodates and iodine oxide.

Finally, U.S. Pat. No. 5,071,648 teaches a process for making an antimicrobial absorbent material based on acetalized PVA sponge comprising binding disinfectant dyes to PVA matrices. The articles made from it are desirable for wound dressings or for uses in body orifices for preventing or abating infections.

In his book, Polyvinyl Alcohol Fibers, Sakurada (1985), in Chapter 9, reviews different heat treatment procedures for PVA fibers. For example, he describes typical dry heat treatment of PVA fibers that is carried out in air at 200° C. to 230° C. for 10 to 30 seconds. Wet heat treatment of PVA fibers is carried out in an autoclave containing aqueous solutions of inorganic salts such as for example, ammonium sulfate or sodium sulfate, at around 130° C. Both of these processes are believed to lead to the increase of the degree of crystallinity and hydrogen bonding of PVA. Furthermore, in Chapters 8 and 11 of the same book, coagulation procedures for spinning PVA fibers using aqueous solutions of sodium sulfate and alkali are also reviewed. All of these procedures are of importance for making and improving properties of cellular PVA hydrogels when using the methods of the present invention.

Thus, the prior art relating to making cellular PVA hydrogels teaches the use of chemical means, that is, the creation of covalent bonds between PVA molecules to permanently stabilize the cellular PVA structure. Most often used, as cross-linking agents, are those from the aldehyde family, and high energy radiation such as electron beam or gamma-ray, all of which create intractable and thus, covalently cross-linked PVA hydrogels insoluble in any solvent.

Acetalized PVA sponges made by aldehyde, have typically 25 to 55%, and often over 70% of alcohol functional groups acetalized. Such a high degree of acetalization of PVA is necessary for covalently cross-linked PVA hydrogels to have reasonable mechanical properties. However, a high s degree of acetalization of PVA leads to a loss of too many hydroxyl groups that may significantly change biocompatibility characteristics. High degrees of acetalization of PVA sponges may also impose severe limitations for a number of uses because of some undesirable physical properties of such PVA sponges. For examples, high degrees of cross-linking of PVA sponges dramatically limits the polymer chain mobility making highly cross-linked PVA hydrogels hard, rigid, abrasive and sometimes too brittle, especially when dry, or low water content hydrogels are obtained. The higher the extent of acetalization of PVA, the harder, more abrasive, more rigid and more hydrophobic, PVA sponges become.

The inventor herein has not found any reference for preparing physically cross-linked cellular PVA hydrogels by using either extractable, pore-forming materials or a frothing method. The invention herein teaches the methods, processes and the like for making and modifying properties of cellular PVA hydrogels by using solvent and/or heat treatment, tailoring properties in wide ranges by selecting desirable processing parameters and/or molecular parameters of components and also manufacturing articles from physically cross-linked cellular PVA hydrogels. In this invention, wide ranges of pore-forming materials or surface active agents can be used to produce cellular PVA hydrogels having remarkable tensile properties and exceptionally wide ranges of physical properties.

One objective of this invention is to provide for the preparation of cellular PVA hydrogels by using various methods to induce physical cross-linking of the PVA molecules free of any additive or any dangling or unreacted functional groups. Another object of this invention is to provide for the preparation of cellular PVA hydrogels by using a wide range of hydrophilic, hydrophobic and biodegradable pore-forming materials which can be removed from the physically cross-linked PVA network. Yet another objective of this invention is to provide for the preparation of cellular PVA hydrogels by using a frothing method.

Still another objective of this invention is to disclose a process for tailoring the physical properties of cellular PVA hydrogels by selecting proper molecular parameters of all ingredients and processing parameters such as, for example, the extent of loading and efficiency of packing of the pore-forming material, the nature and form of pore-forming materials; the nature of the surface active agents, and the use of solvent treatment and heat treatment procedures to modify the properties of cellular PVA hydrogels.

Yet another objective is to disclose methods to color and/or make such PVA hydrogels radio opaque and finally, there is an objective of disclosing the complexing of iodine and the PVA hydrogels and the binding of other germicidal agents to such PVA matrices in the cellular PVA hydrogels.

THE INVENTION

The invention disclosed herein deals with physically cross-linked cellular PVA hydrogels prepared in one method by removing pore-forming materials from the matrices of the cellular PVA hydrogels, and in another method, frothing PVA solutions to form cellular PVA hydrogels.

With more specificity, there is disclosed one method of preparing physically cross-linked cellular hydrogels, the method comprising the steps of providing a polymer capable of being physically cross-linked and dissolving the polymer in a material which is a solvent for the PVA, or a mixture of solvents for the PVA, to form a solution.

Thereafter, the solution thus formed is mixed with a pore-forming material and then brought to conditions at which the polymer will undergo physical cross-linking. Thereafter, the mixture is brought to about room temperature and the solvents are removed by a method that does not significantly affect the cross-linking sites of the matrices or the pore-forming material.

The physically cross-linked matrix is then heated for a period of time to further increase the degree of physical crosslinking of the polyvinyl alcohol matrix, and then cooling the cross-linked matrix to about room temperature and removing the pore-forming material by a means that does not significantly affect the cross-linking. Such a process provides sponges having collapsed walls.

When these steps are essentially followed, there is provided a cellular PVA structure which has thin or collapsed walls having high compressibility in the wet state and the dry state, an exceptionally strong and tear resistant, and a more or less abrasive, rugged cellular material. However, when the step with regard to removing the solvent is skipped, resulting in a solvent based material, and/or when the heat treating at elevated temperatures step is not carried out, the resulting cellular hydrogel will have fully expanded, fully hydrated, cellular walls, which are familiar to those skilled in the art of physically cross-linked PVA hydrogels. Another point at which heat treatment can be carried out is after the hydrogel is brought to room temperature and the pore forming material and all solvents have been removed. This point of heat treatment is also effective in modifying the properties of cellular PVA hydrogels, but the cellular article would have a reduction in its size and shape and a reduction in the size and shape of pores.

Heat treatment cannot be done if solvent is present because physical crosslinking sites of PVA will be destroyed and the hydrogel will revert to a PVA solution. Thus, all solvents for PVA have to be removed before heat treatment can be carried out effectively for purposes of this invention.

An alternative method of inducing physical cross-links is to immerse the mixture of PVA and pore-forming material directly into (a) a solvent for the polymer, if the bath is kept at a low enough temperature so that it does not actually dilute the polyvinyl alcohol solution rather than gel it; non-solvents, or poor solvents, for the PVA, or (b) aqueous solutions of a salt, acid, or base or the like, or by adding appropriate pore forming materials into the PVA solution, which after partial dissolution in the PVA solution, will cause formation of physical cross links in the PVA matrix. In all these cases, mixtures can be held at room temperature or heated at elevated temperatures below about 180° C. The preferred method is to immerse the polyvinyl alcohol in non-solvents, poor solvents and aqueous solutions of salts and bases. They work under a wider range of conditions. The only limitation for their use is that they cannot be used at or above the degradation temperature of the PVA and the pore-forming material.

When one uses solvents for the polyvinyl alcohol polymer and aqueous solutions of acids as the bath media, to induce physical cross-linking, one has to be careful how they are being used. This is because the media inherently tends to preferentially mix with or dilute the PVA when brought into contact with it, rather then gelling the PVA. When the correct conditions are selected for these solvents and acids, they can induce formation of the physical cross-links in the PVA solution. In order for the solvents and aqueous solutions of acids to induce physical cross-links in the polyvinyl alcohol solution, they have to be kept at low enough temperature. The primary reason for lowering the temperature is to lower the solvation power so that they will preferentially induce physical cross-links rather than mix with the solution.

Concentrated acids, and aqueous solutions of acids such as, HCl and acetic acid, and solvents such as dimethylsulfoxide and water, as a bath or immersion media, kept at low temperature (at or below room temperature) have been used by the inventor herein and several cross-linked materials were obtained with reasonably good physical properties.

Another method of inducing physical cross-links is by directly removing original solvent from the mixture of PVA and pore-forming material.

It should be noted that the method modifications set forth just above can be used as well when cellular PVA hydrogels are prepared by the frothing method. It is important to keep in mind that the frothed structure needs to be stabilized first, by cooling to a "lower temperature" before it is treated by solvents or aqueous solutions of salts, and the like.

The method for the modification is thus a method of preparing physically cross-linked cellular hydrogels comprising the steps of providing a polymer capable of being physically cross-linked. Thereafter, dissolving said polymer in a solvent selected from a single solvent for the PVA or a mixture of solvents for the PVA to form a solution. The solution so formed is then mixed with a pore-forming material and then the mixture is brought to a temperature or conditions at which the polymer will undergo physical cross-linking. The mixture is then brought to about room temperature and then the pore-forming materials are removed by a method that does not significantly affect the cross-linking sites of the PVA hydrogel.

In both of the aforementioned methods it is contemplated within the scope of this invention to wash the cellular material with water if it is deemed necessary. Also, it is to be noted that when solvent extraction is used in the method, i.e. the solvent is removed as part of the method. The physical properties of the cellular PVA hydrogel may be significantly modified, depending on the nature of the extraction solvent being used. Also, it should be noted that in some cases, physical properties of the hydrogel obtained are sufficient so that the heat treatment may not be necessary at all.

With regard to the preparation of the polymer solutions that are useful in this invention, the PVA is dissolved in a single or mixed solvents such as, for example, water, organic solvents, mixed solvents which may include water/water miscible organic solvents or mixed organic solvents or aqueous solutions of inorganic salts, acids, or bases. The instant invention does not appear to have any limitations on the choice of or nature of the selected solvent except that the incipient PVA must be soluble in the chosen solvent or mixed solvents. Typically, the choice of the solvent that is used to dissolve the PVA is based on the degree of polymerization and degree of hydrolysis of the PVA, the nature of the method used to create cellular structures, the extent of the post treatment in the presence or non-presence of the solvent and particularly by the desired final physical properties of the cellular PVA hydrogels.

The preferred average degree of polymerization of the PVA is above 1,000. Typically, the higher the degree of polymerization of the PVA, the more desirable are the mechanical properties of the cellular PVA hydrogels. PVA with degrees of polymerization lower than about 1,000, such as, for example about 500, can also be used to make cellular PVA hydrogels according to this invention. However, such cellular PVA hydrogels may not have sufficiently good mechanical properties especially at low PVA concentrations. Sometimes, heat treatments according to the methods herein may provide good mechanical properties of such materials.

The degree of hydrolysis of the PVA is also a critical molecular parameter. The preferred degree of hydrolysis of the PVA is higher than 88 percent. If cellular PVA.gels having high strength and high tear resistance are desired, then the preferred degree of hydrolysis of PVA must be greater than 95 percent, and fully hydrolyzed PVA is most preferred. The preferred degree of branching is a minimum amount of branching, and highly preferred is no branching at all.

The concentration of the PVA solution is between 0.5 and 50 weight percent. The preferred concentration of the PVA solution useful in the methods of this invention will depend upon the degree of polymerization, degree of hydrolysis of the PVA, the desired properties of the cellular hydrogels, the nature of and the amount of solvent used to make the PVA solution, dissolution temperature, the nature of the pore-forming material in the case where the method used requires the pore-forming material, the extent of loading of pore forming material, the nature and the extent of post treatment, such as solvent treatment and without heat treatment, the nature of the extraction of solvents, and in the case of the frothing method, the nature of, and type of, surface active agents, foam stabilizers and thickeners that are used in the method.

With regard to the frothing method, any solvent that is used in the pore forming method can also be used as long as the PVA is soluble in the chosen solvent and the gas bubbles formed by frothing can be stabilized in the PVA solution until physical cross-linking of the PVA takes place. As above, the choice of the nature of the solvent used to dissolve PVA is based on the degree of polymerization and degree of hydrolysis of PVA, the availability of appropriate surface active agents for stabilization of gas bubbles, the nature of the post treatment and particularly by the desirable physical properties of cellular PVA hydrogels.

Also in the frothing method, it is preferred to froth the PVA solutions at as low temperature as practically possible. The lower the temperature, the more stable the froth and the less shrinkage will occur when the froth is cooled to induce physical crosslinking of PVA. It is critical that during frothing of the PVA solutions, the PVA solutions are in a sufficiently fluid state at the selected temperature in order to be able to froth them. The extent of frothing is determined by the nature and activity of the surface active agent being used, the thickeners, and the amount of the each of the above added to the PVA solution and the type and the rate of mechanical mixing. This in turn determines the extent and the nature of porosity of the cellular PVA hydrogels.

When an aqueous solution of PVA is used for frothing and for loading pore-forming material, the physical cross-linking of the PVA can be accomplished by subjecting the PVA froth, or mixture of PVA, and pore-forming material either to a single freezing and de-freezing, or repeated freezing and de-freezing cycles or, freezing and then complete or partial freeze drying under vacuum without de-freezing. In the case when aqueous solutions are frothed these methods may produce relatively weak cellular PVA hydrogels, therefore, it is advantageous to subject these hydrogels to an additional post treatment such as solvent or heat treatment, the processes that induce additional crystallization, and thus lead to an improvement in physical properties of cellular PVA hydrogels. As noted above, before solvent and/or heat treatment can be used, the frothed structure has to be stabilized first by cooling to induce some physical cross-linking. Use of aqueous PVA solutions has typically an advantage over the use of other PVA solutions because of the ease of frothing and generating stable froth.

As eluded-to above, the present invention discloses methods to tailor the porosity pore size and pore geometry, the pore size and pore geometry distribution, and other physical properties of cellular PVA hydrogels and articles made from them. All of the physical properties of the cellular PVA hydrogels can be varied widely by varying processing conditions and molecular parameters of PVA and the nature of solvents and other components. All of the physical properties can be further varied by selecting proper conditions for solvents, aqueous solutions, or dry-wet heat treatment. For example, cellular PVA hydrogels can be very soft to very hard, firm and abrasive, very fine and delicate to rugged, very tough, exceptionally strong and tear resistant, have a very low to exceptionally high compressibility and expandability in wet and the dry states, have widely varying capacity to hold water and polar solvents, and may have unique physical properties such as controlled expansion during hydration.

In this invention, it is preferred to mix materials with the PVA solution at elevated temperatures in inert atmospheres, typically at 60 to 160° C. It is also desirable to pre-heat the material to approximately the same temperature as that of the PVA solution prior to addition to the PVA solution. After the PVA solution is mixed with the pore-forming material, the mixture is cooled to below 160° C. which may go as low as 0° C. or below to accelerate the formation of physical crosslinking sites. The loading temperature of the material and the temperature at which cross-linked PVA network will be formed is a function of the PVA concentration, molecular parameter of the polymer, the nature of the solvent used to dissolve the PVA, and the nature, and extent of loading and the size of particulates of the pore-forming material.

The extent of loading and degree of packing of removable, pore forming materials are defined by the degree of desired porosity of the cellular material, desired wall thickness of pores, and whether "skin" on the surface of the cellular material is desired or not. The pore size, pore geometry and pore size and pore geometry distribution of cellular PVA hydrogels can be precisely controlled by selecting the pore-forming material having appropriate parameters. The pore-forming materials of this invention are solids or liquids, hydrophilic or hydrophobic in nature, and can be biodegradable, or thermally degradable, can be removed from the physically cross-linked PVA matrix. The removal can be accomplished either by extraction with water, or mixed solvent of water and water miscible solvents, or extraction with hydrophilic or hydrophobic organic solvents or mixtures thereof, or by alkali or acid solutions or by other means such as thermal, vacuum evaporation, radiation, biologically induced degradation, and the like.

The fact that the cellular PVA hydrogels of the present invention are produced without the use of multi-functional cross-linkers or any other additives required to create covalent cross-linking sites, is a very desirable feature for hydrogels particularly when used in biomedical applications. A need for such bulk PVA hydrogels has been consistently emphasized in the scientific literature. However, the present invention now provides novel routes to prepare cellular PVA hydrogels without the use of covalent cross-linking. It is believed that the physical cross-linking through crystallites and hydrogen bonding are responsible for exceptional physical properties and biocompatibility of physically cross-linked PVA hydrogels.

The cellular materials of this invention can be colored or rendered radio opaque. Such additives are added before or at the time that the pore forming materials are added, or at the time that the frothing step is performed in the frothing method. Such radio opaque materials are those having high electron densities and include, but are not limited to, barium sulfate, bismuth suboxide, gold and the like. Radio opaque materials can be added in various amounts to cellular PVA hydrogels, usually at the level of from 1 to about 35 weight percent based on the weight of PVA. When higher visual contrast is desired, the higher levels of radio opaque material need to be incorporated into the walls of cellular PVA hydrogels. The cellular materials of this invention are colored with non-elutable, non-toxic pigments or dyes, typically by dispersing the colorant in the PVA solution before the addition of the pore forming material. Coloring can also be done after the pore-forming materials have been removed from physically cross-linked PVAL matrices by placing the sponge into the solution containing the desired colorant. The colorant can be stabilized in cellular PVA matrix by drying and then heating the dry cellular PVA matrix which may induce chemical binding, when possible, between the dye and the PVA which would then immobilize the colorant. The cellular materials of the invention can also be plasticised and thus can be made permanently flexible by incorporating suitable plasticizers, such as, but not limited to polyhydric alcohols having 2 to 6 carbon atoms and 2 to 3 hydroxyl groups, particularly alkane diols and triols and especially ethylene glycol, propylene glycol, diglycols, diethylene glycol, triethylene glycol, dipropylene glycol, tripropylene glycol, neopentyl glycol, triglycols, glycerin (1,2,3-propanetriol), trimethylol propane, trimethylol ethane, triethylene glycol, propanediol, butanediol, hexanediol and hexanetriol, polyethylene and polypropylene glycols of various molecular weight, trimethyl or triethyl citrate, methyl or ethyl lactate, methyl or ethyl glycolate or 2-ethyl-2 (hydroxymethyl)-1,3-propanediol and the mixtures thereof. The use of triethylene glycol is especially preferred for plastization of the sponges used in topical applications and the use of glycerin when the plasticizer needs to have low cytotoxicity.

The mechanical properties of the PVA gels of this invention can be enhanced by solvent treatment and/or heat treatment. When solvent treatment is desired, substantially all of the solvent or solvents used to prepare the PVA gel need to be removed first by extraction or evaporation. The solvent extraction and the solvent treatment are typically done simultaneously by simply placing the PVA hydrogels into low boiling point solvent, non-solvent, or poor solvent for PVA, such as, for example, methanol or ethanol or acetone baths to extract all of the solvents used to prepare the PVA solution. In order to accelerate solvent removal, the use of Soxlet-type of extractions is preferred. Upon extraction of all original solvents used to prepare the PVA hydrogels, the cellular PVA gel becomes significantly stronger when using low molecular weight alcohols or acetone. It was also found that the simple drying at room temperature of cellular PVA gel extracted with these high vapor pressure solvents typically further improves mechanical properties of gel on re-hydration. Once original solvents, used to prepare the PVA solution are removed and the PVA gel has been dried, frequently the mechanical properties of cellular PVA hydrogels are dramatically further improved by subsequent heat treatment at elevated temperatures. Properties can be further improved by placing the sponge mixture into the bath containing aqueous solutions of salt, acid, base or organic compounds. One can also directly submerse the mixture into aqueous solutions of these compounds and hold it at room temperature or elevated temperature to significantly improve physical properties of cellular PVA hydrogels.

As indicated above, the present invention requires that in order to maximize the improvement of physical properties of re-hydrated PVA hydrogels, substantially all solvents originally used to prepare the PVA solutions must be removed from the cellular PVA gels before the cellular PVA structure is subjected to the heat treatment at elevated temperatures. Before cellular PVA hydrogels are heat treated with either or a combination of dry heat, wet heat, or non-solvent heating, at elevated temperatures, their cell walls are typically thick, fully hydrated, soft, having slippery surfaces and relatively moderate compressibility and expandability. However, after the heat treatment, the cellular PVA hydrogels may have extremely thin walls, they become more abrasive and rugged, exceptionally strong and tear resistant, have fast wicking, have exceptionally high compressibility and/or expandability in the dry and in the wet state. The heat treatment is believed to be an annealing process that causes an increase in crystallinity of the PVA. The increase in crystallinity reduces the ability of the PVA walls to hydrate and expand, making walls of such cellular structures more or less rigid, rugged and abrasive, leading to significant increase in mechanical strengths. Tensile strength, tear resistance, ruggedness, of cellular walls are all a function of wall thickness, extent of wall hydration all of which are ultimately controlled by the degree of crystallinity of PVA. The other process, which may also increase tensile strength of PVA hydrogels, such as chemical cross-linking or coordination bonding are not desirable since these processes lead to far lower increases in mechanical properties as compared to heat treatments and also they may cause some undesirable changes in biocompatibility and physical properties of cellular PVA hydrogels.

The preferred heat treatment according to this invention is carried out at temperatures between about 40 and about 180° C., preferably in vacuum or non-oxidizing atmospheres such as nitrogen or non-oxidizing liquids such as silicone oils, non-solvents for PVA or aqueous solutions of salt, acid, base, or organic compounds, in all of which PVA hydrogel remains insoluble during the treatment. Heat treatment may also be carried out in air but oxygen from air may cause undesirable oxidative degradation of the PVA. It is critical that the heat treatment temperatures be lower then the melting temperature or degradation temperature of selected PVA and all ingredients such as reinforcing agents, laminating agents, colorants, radio opaque materials, must also be stable at selected heat treatment temperatures.

Additionally, the heat treatment of cellular PVA hydrogels provides additional desirable process to control pore structure. The heat treatment has significant effects on the thickness of walls of cellular structures, pore sizes and pore geometry. Although sponges with thin walls can be made by either heat-treating a sponge before or after extraction of the pore-forming materials, the preferred stage for treatment is with pore-forming materials still being intact in the PVA networks. This procedure typically preserves the overall physical parameters of the pores of the sponge. However, if the heat treatment is performed after the pore-forming material has been extracted, the heat treatment will cause significant changes, typically, a reduction in overall physical parameters and the shape of articles made from cellular PVA hydrogels.

Cellular PVA hydrogels are expected to have substantially the same biocompatibility as that reported for physically cross-linked PVA hydrogels made in bulk form. This is because cellular PVA hydrogels of the present invention contain no material or functional groups other then PVA itself, just as in the case of physically cross-linked bulk PVA hydrogels. These cellular PVA hydrogels require no other ingredient to be incorporated permanently into its structure besides PVA itself because physical integrity of these materials is achieved through physical cross-linking of the PVA. The cellular PVA hydrogels of the present invention will not exude or release any substance or expose any functional or reactive groups to tissue other than hydroxyl groups from the PVA itself. Therefore, the cellular PVA hydrogels of this invention are expected to exhibit superior anti-thrombogenic properties and biocompatibility compared to prior art PVA sponges made by covalent cross-linking. The cellular PVA hydrogels will not irritate tissue nor encourage tissue growth into it nor will it adhere to a tissue nor do they require adhesion prevention ointments, such as petroleum jelly that could produce foreign body reactions of a tissue. As such, the cellular PVA hydrogels of this invention are highly desirable materials in a number of biomedical applications.

In contrast to the above, the cellular PVA hydrogels made by he covalent cross-linking method of the prior art, create considerable biocompatibility concerns especially when used as long-term human implants. In this case covalently cross-linked PVA sponges containing dangling functional groups of non-reacted cross-linker molecules and/or non-reacted toxic residues of cross-linking agents, all of which are typically located on or near the surface of an article, or may leach out during use. This is especially important when highly toxic irritant crosslinkers such as formaldehyde and glutaric aldehydes are used for the cross-linking. The biocompatibility of covalently cross-linked PVA sponges is further reduced because covalently cross-linked PVA sponges typically lose 50 percent to over 70 percent of their hydroxyl groups during cross-linking.

Another important aspect of cellular PVA hydrogels is related to the information reported in U.S. Pat. No. 4,734, 097 in which it is indicated that PVA hydrogels are capable of allowing water and water soluble low molecular weight compounds such as ammonia, common salts, uric acid, urea, creatinine, glucose, lactic acid and antibiotics pass through the surface of bulk PVA hydrogels. However, the intrusion of bacteria, yeasts and molds cannot take place through the surface of a bulk PVA hydrogel. Therefore, in the event that a sterile hydrogel is exposed to non-aseptic environment, the contamination of PVA hydrogels is only limited to the surface of a hydrogel. The PVA hydrogels can be made aseptic again by sterilizing their surface by using ultraviolet light or ethylene oxide, propylene oxide, ozone, hydrogen peroxide, aldehydes, ethyl alcohol, isopropyl alcohol, or chlorohexidine, followed by washing with sterile water or saline.

Because of the unique physical properties of the cellular PVA hydrogels made according to this invention and because of their good biocompatibility, these cellular PVA hydrogels are expected to have a significantly wider range of applications in the biomedical field than covalently cross-linked PVA sponges. The PVA sponges of the present invention can easily be made to contain very low to very high water content and thus can easily match the water contents of different tissues. They can be used externally or internally such as, but not limited to, bandages for application to wounds, trauma such as thermal and chemical burns, ulcers, lesions and surgical sites, sanitary napkins, swabs, surgical aids, various implants, such as cardiovascular, reconstructive and cosmetic surgeries, and the like. As surgical aids, these sponges can be used to remove body fluids such as blood, serum, plasma, lymph, spinal fluid, urine, sweat, bile, and digestive fluids. The sponges can be used to support and/or separate organs and absorb blood and other body fluids during internal surgeries such as operations in thoracic cavities or abdominal cavities. Their smooth surfaces prevent abrasion to even the most delicate tissues, such as brain tissue while maintaining their antithrombic character. Separation of organs can be also done using PVA hydrogel sponges made in the form of films and sheets which can also be reinforced with short or long fibers or woven or non-woven fabrics, the appropriate orientation of reinforcement agents can provide, at he same time, the exceptionally high softness of the material on the surfaces but also the exceptional mechanical properties such as strength and modulus in the direction of reinforcement when the reinforcement is properly chosen and/or oriented. PVA hydrogel sponges can be used alone or in combination with gauze pads to significantly improve and broaden the scope of the gauze pad applications.

In order to maintain a high level of purity and thus biocompatibility of the cellular PVA hydrogels, it may be desirable to carry out all of the manufacturing in a clean room environment and use pure PVA, solvents and pore-forming materials, colorants, radio opaque materials, reinforcing materials, laminating materials, and all other components. Sterilization of cellular PVA hydrogels of this invention can be carried out in a number of different ways. For example, it can be done by steam at a high pressure at the stage before gelling, that is, after all ingredients are added to the system. It is desirable to steam autoclave the mixture at 100° C. to 140° C. under pressure for 20 to 60 minutes to ensure complete sterilization. The sterilization can also be done at the same stage without the use of steam, by simply holding the PVA solution with all ingredients at 100° C. to 160° C. for 30 to 120 minutes, under sterile conditions. Sterilization can be done at the stage when cellular PVA gels are subjected to the heat treatment. One can also produce sterile products made from cellular PVA hydrogel by subjecting cellular PVA hydrogels or the final products to high energy radiation. And finally, one can make sterile products by using ethylene oxide, propylene oxide, ozone, hydrogen peroxide, aldehydes, ethyl alcohol, isopropyl alcohol, or chlorohexidine followed by washing with sterile water or saline.

The PVA hydrogels are stable in acidic environments such that they can be used in long term oral drug delivery systems. Once a day oral delivery of drugs is considered to be the most convenient route but it still faces some serious obstacles. The oral delivery system could not be used for those drugs which are susceptible, for instance, to degradation by digestive enzymes. However, these PVA hydrogels can deliver drugs for prolonged periods of time since PVA hydrogels are stable in digestive systems, they are not harmful to digestive tracts, and also can be modified to preferably release drugs in certain portions of the digestive tract, that is, can be used for targeting and triggering release under certain environments such as pH and the like. Another embodiment of the present invention is the ability to use cellular PVA hydrogels in alkaline environments. PVA has an excellent resistance to alkalis. Properties of PVA and its hydrogels do not degrade even in severe alkali conditions, in fact, it seems that PVA becomes more stabilized under such conditions.

The pore sizes, pore geometry's and pore size and pore geometry distribution can be precisely controlled in essentially any range practically desired. Numbers of different pore forming particles having well defined particle geometries and monodisperse size distribution are available or can be custom made to accomplish such a goal using for instance colloidal silica, salts, sugar, starch, non-solvents, and the like. Essentially all of these pore-forming materials having either uniform or polydisperse particle size distribution can be uniformly dispersed throughout the PVA hydrogels.

Another embodiment of the present invention is the preparation of high performance absorbents from porous cellular PVA hydrogels. For example, one can make high performance absorbent particles having the average particle size of a super absorbent particle in the dry state in the range from about 1 micron to something on the order of millimeters or centimeters. These absorbents in the form of sheets or particles can be used in various applications of containment of hazardous spills in biomedical applications, especially when combined with bactericides and the like.

Interfacial bonding can be provided by partially imbedding fibers, mat, woven or non-woven sheets into the surface of the PVA hydrogels. The nature of the fibrous materials used in imbedding can be cellulose, silk, carbon fibers, Vectura® fibers, and the like Since the hydrogels can be co-extrude, co-mold or co-cast with a variety of different materials or used to modify surfaces of essentially any material, the range of properties and applications of cellular PVA hydrogels of the present invention becomes essentially endless. Such composite cellular PVA hydrogels may have wide ranges of applications and designs of articles which may be limited by he imagination of designers of articles and designers imagination to request performance characteristics for the article.

As alluded to earlier in this specification, the hydrogels of this invention can be complexed with iodine and can be combined with other germicides. The iodine complex has an extraordinary antimicrobial activity while providing a soft and gentle sponge that does not adhere to the tissue. Furthermore, it provides a color indication of the status of its antimicrobial activity. It is well known that iodine is an outstanding microbiocide having an extraordinary range of action while having low cytotoxicity at low iodine concentrations. For example, iodine is especially desirable for use against bacteria, tubercle bacilli, fungi, protozoa and viruses. Using iodine complexes with the cellular PVA hydrogels iodine can be delivered in a controlled manner that thus will overcome the typical problem of delivery of iodine to tissue at the desired rate and time period. When cellular hydrogel forms a complex with iodine it has a golden color until used, but when applied to tissue it assumes an active black color. When iodine is consumed the black color disappears which provides a visual indication of the activity status of iodine in the wound dressing. Use of plasticizers is also desired to permanently soften cellular PVA hydrogels complexed with iodine.

Other disinfectants can be bound to PVA hydrogels, including disinfectant dyes, for example methylene blue, gentian violet, acridine orange, brilliant green, acridine yellow, quinacrin blue, and trypan red. These dyes become strongly bound to PVA hydrogels if the PVA hydrogels are submersed in the aqueous solution of the dyes. These dyes will not be released from an aqueous solution after an excess of a dye has been washed away. These dyes are particularly attractive for use in the production of medical and personal care products and especially for the production of germicidal bandages, surgical, packings, sanitary napkins and tampons, and the like. This is because bound disinfectant dyes inhibit bacterial growth on the sponge and because several common bacteria can be killed if incubated in the presence of these dyes.

Mechanical properties of bulk PVA hydrogels were measured as prepared by different methods. The methods and the results appear below in TABLE I.

TABLE I

| Methods of Inducing physical properties into PVA matrices | tensile strength Psi | elongation % | water content wt % |
|---|---|---|---|
| Clear PVA hydrogel by using co-solvent, cooled to −20° C., 12 hrs. | 480 | 700 | 90 |
| Same as above but cooled for 2 hrs. | 320 | 550 | 90 |
| Hazy PVA hydrogel, by using water Only, single freeze cycle | 180 | 450 | 90 |
| Same as above, but 5 freeze cycles | 260 | 500 | 90 |
| Same as above, but slow thaw | 230 | 450 | 90 |
| Same as above but by partial De-hydration | 880 | 400 | 60 |
| Used water as a solvent for the PVA and Used radiation to cross link | 10 | 25 | 90 |

Mechanical properties of cellular Polyvinylalcohol hydrogels as prepared by the frothing method were obtained. The results are set forth on TABLE II.

TABLE II

| Treatment of frothed PVA solution | PVA dissolved in water | | PVA dissolved in co-solvent | |
|---|---|---|---|---|
| | Tensile Strength/ Psi | Elong./ % | Tensile strength/ Psi | Elongation/% |
| Cooled to −20° C. and thawed | 0 | 0 | 50 | 100 |
| Cooled to −20° C. and extracted with acetone at room Temperature | 220 | 250 | 250 | 150 |
| Same as above but extracted with ethanol | 200 | 250 | 230 | 200 |
| Cooled to −20° C. and immersed in aqueous salt solution at Room Temperature for thirty minutes | 450 | 100 | 550 | 100 |
| Same as above but heated to 90° C. for 15 minutes | 700 | 80 | 750 | 80 |
| Cooled to −20° C., extracted with acetone, dried, heated in vacuum at 90° C. for 60 minutes | 750 | 80 | 850 | 50 |
| Same as above but heated to 120° C. for 10 minutes | 950 | 50 | 950 | 50 |

Mechanical properties of cellular PVA hydrogels obtained by the methods set forth below and were tested and the results are shown on TABLE III below.

TABLE III

| Methods used to (a) induce physical cross-links and (b) to modify physical properties of the cellular PVA hydrogels | Tensile Strength psi | Elongation % |
|---|---|---|
| PVA dissolved in water and cosolvent. Salt was used as the pore-forming material | | |
| 1. cooled to −20° C., 12 hrs. | 480 | 600 |
| 2. same as 1., but extracted with acetone, dried at room temperature and re-hydrated | 550 | 500 |

TABLE III-continued

| Methods used to (a) induce physical cross-links and (b) to modify physical properties of the cellular PVA hydrogels | Tensile Strength psi | Elongation % |
|---|---|---|
| 3. same as 2., but heated at 150° C. in vacuum for 2 minutes | 1100 | 20 |
| 4. same a 2. but heated in silicone oil at 120° C. for 30 minutes | 950 | 100 |
| 5. same as 1., but immersed in aqueous salt solution, at room temperature for 60 minutes | 850 | 250 |
| 6. same as 5. but heated to 90° C. for 30 minutes | 950 | 150 |
| PVA dissolved in water; salt as the pore forming material. | | |
| 7. cooled to −20° C., 12 hrs. | 450 | 400 |
| 8. same as 7. but extracted with acetone, dried and heated to 120° C. for thirty minutes | 800 | 220 |
| PVA dissolved in water and co-solvent. Crystalline sugar as the pore-forming material | | |
| 9. cooled to −20° C., 12 hrs. | 380 | 400 |
| 10. same as 9. but extracted with acetone, dried and re-hydrated | 450 | 350 |
| 11. same as 10. but heated to 120° C. in a vacuum for 30 min. | 780 | 100 |

What I claim is:

1. A method of preparing hydrogel sponges having collapsed walls, said method comprising the steps of:
   (I) providing a polymer capable of being physically cross-linked;
   (II) dissolving said polymer in a material selected from the group consisting essentially of:
      (i) a single solvent for the polyvinyl alcohol and,
      (ii) a mixture of solvents for the polyvinyl alcohol, to form a solution;
   (III) mixing the solution formed in (II) with a pore-forming material;
   (IV) providing conditions for the mixture of (III) in which the polymer will undergo physical cross linking;
   (V) bringing the mixture from (IV) to about room temperature;
   (VI) removing essentially all of the solvents by a method which does not significantly affect the cross-linking or pore-forming material;
   (VII) heating the mixture at an elevated temperature for a period of from ten seconds to eight hours, and
   (VIII) cooling the mixture from (VII) to about room temperature and removing the pore-forming material by means which does not significantly affect the cross-linking, whereby a sponge having collapsed walls is obtained.

2. A method of preparing hydrogel sponges having expanded walls, said method comprising the steps of:
   (I) providing a polymer capable of being physically cross-linked;
   (II) dissolving said polymer in a material selected from the group consisting essentially of:
      (i) a single solvent for the polyvinyl alcohol and,
      (ii) a mixture of solvents for the polyvinyl alcohol, to form a solution;
   (III) mixing the solution formed in (II) with a pore-forming material;
   (IV) providing conditions at which the polymer from (III) will undergo physical cross linking;
   (V) bringing the mixture from (IV) to about room temperature;
   (VI) removing the pore-forming material by a means which does not significantly affect the cross-linking, whereby a hydrogel sponge having expanded walls is obtained.

3. A method of preparing physically cross-linked cellular hydrogels, said method comprising the steps of:
   (I) providing a polymer capable of being physically cross-linked;
   (II) dissolving said polymer in a material selected from the group consisting essentially of:
      (i) a single solvent for the polyvinyl alcohol and,
      (ii) a mixture of solvents for the polyvinyl alcohol, to form a solution;
   (III) mixing the solution formed in (II) with a pore-forming material capable of partially dissolving in solution (II) and its solution capable of causing formation of physical cross-linking in the polyvinyl alcohol;
   (IV) providing conditions at which the polymer from (III) will undergo physical cross-linking caused by the presence of partially dissolved pore-forming material;
   (V) bringing the mixture from (IV) to about room temperature;
   (VI) removing the pore-forming material by a means which does not significantly affect the cross-linking, whereby a hydrogel sponge having partially collapsed walls is obtained.

4. A method of preparing physically cross-linked cellular hydrogels, said method comprising the steps of:
   (I) providing a polymer capable of being physically cross-linked;
   (II) dissolving said polymer in a material selected from the group consisting essentially of:
      (i) a single solvent for the polyvinyl alcohol and,
      (ii) a mixture of solvents for the polyvinyl alcohol, to form a solution;
   (III) mixing the solution formed in (II) with a pore-forming material capable of partially dissolving in solution (II) and its solution capable of causing formation of physical cross-links in the polyvinyl alcohol;
   (IV) providing conditions at which the polymer from (III) will undergo physical cross-linking caused by the presence of partially dissolved pore-forming material;
   (V) bringing the mixture from (IV) to about room temperature;
   (VI) removing all of the solvents by a means which does not significantly affect the cross-linking or pore forming material;
   (VII) heating the material at an elevated temperature for a period of time of ten seconds to eight hours, and
   (VIII) cooling the mixture from (VII) to about room temperature and removing the pore-forming material by a means which does not significantly affect the cross-linking, whereby a sponge having collapsed walls is obtained.

5. Method of preparing physically cross-linked cellular hydrogels, said method comprising the steps of:
   (I) providing a polymer capable of being physically cross-linked;
   (II) dissolving said polymer in a material selected from the group consisting essentially of:

(i) a single solvent for the polyvinyl alcohol and,
(ii) a mixture of solvents for the polyvinyl alcohol, to form a solution;

(III) mixing the solution formed in (II) with a pore-forming material;

(IV) submersing the mixture from (III) in a bath consisting of a material selected from the group consisting essentially of:
(a) a solvent for the polyvinyl alcohol polymer wherein the solvent is at a low temperature;
(b) a non-solvent for the polyvinyl alcohol polymer;
(c) a poor solvent for the polyvinyl alcohol polymer, and
(d) an aqueous solution of a material selected from the group consisting essentially of:
(i) a salt;
(ii) an acid at a low temperature, and
(iii) a base, to induce crystallization, gellation, coagulation, or a mixture of crystallization, gellation, or coagulation, of the polyvinyl alcohol polymer;

(V) bringing the mixture from (IV) to about room temperature and removing essentially all of the pore-forming materials by means which do not significantly affect the cross-linking, whereby a physically cross-linked cellular polyvinyl alcohol hydrogel is obtained.

6. Method of preparing physically cross-linked cellular hydrogels, said method comprising the steps of:

(I) providing a polymer capable of being physically cross-linked;

(II) dissolving said polymer in a material selected from the group consisting essentially of:
(i) a single solvent for the polyvinyl alcohol and,
(ii) a mixture of solvents for the polyvinyl alcohol, to form a solution;

(III) mixing the solution formed in (II) with a pore-forming material;

(IV) submersing the mixture from (III) into a material selected from the group consisting of:
(i) a solvent for the polyvinyl alcohol at low temperature;
(ii) a non-solvent for the polyvinyl alcohol, and
(iii) a poor solvent, to induce crystallization, gellation, coagulation, or a mixture of crystallization, gellation, or coagulation, of the polymer;

(V) bringing the mixture from (IV) to about room temperature and removing essentially all of the pore-forming material by means which do not significantly affect the cross-linking, whereby a physically cross-linked cellular polymer is obtained.

7. A method of preparing physically cross-linked cellular hydrogels, said method comprising the steps of:

(I) providing a polymer capable of being physically cross-linked;

(II) dissolving said polymer in a material selected from the group consisting essentially of:
(i) a single solvent for the polyvinyl alcohol and,
(ii) a mixture of solvents for the polyvinyl alcohol to form a solution;

(III) mixing the solution formed in (II) with a pore-forming material;

(IV) submersing the mixture from (III) in a bath consisting of an aqueous solution of a material selected from a group consisting essentially of:
a. a salt,
b. an acid at low temperature and,
c. a base, to induce crystallization, gellation, coagulation, or a combination of crystallization, gellation, or coagulation, of the polymer;

(V) bringing the mixture from (IV) to about room temperature and removing essentially all of the pore-forming materials by means which do not significantly affect the cross-linking, whereby a physically cross-linked cellular polyvinyl alcohol is obtained.

8. Method of preparing physically cross-linked cellular hydrogels, said method comprising the steps of:

(A) providing a polymer capable of being physically cross-linked;

(B) dissolving said polymer in a material selected from the group consisting essentially of:
(i) a single solvent for the polyvinyl alcohol and,
(ii) a mixture of solvents for the polyvinyl alcohol, to form a solution;

(C) mixing the solution from (B) with a material selected from the group consisting essentially of:
(i) a surface active agent and,
(ii) a mixture of surface active agents and frothing said mixture;

(D) cooling the frothed mixture from (C) to a temperature at which the polymer will undergo physical cross-linking;

(E) essentially removing any solvent present in the frothed mixture by a means which does not significantly affect the cross-linking;

(F) bringing the mixture to an elevated temperature for a period of time and cooling the mixture to about room temperature whereby a physically cross-linked cellular hydrogel is obtained.

9. A method of preparing a physically cross-linked cellular hydrogels, said method comprising the steps of:

(A) providing a polymer capable of being physically cross-linked;

(B) dissolving said polymer in a material selected from the group consisting essentially of:
(i) a single solvent for the polyvinyl alcohol and,
(ii) a mixture of solvents for the polyvinyl alcohol to form a solution;

(C) mixing the solution from (B) with a material selected from the group consisting essentially of:
(i) a surface active agent and,
(ii) a mixture of surface active agents and frothing said mixture;

(D) cooling the frothed mixture from (C) to a temperature at which the polymer will undergo physical cross-linking;

(E) bringing the mixture to about room temperature whereby a physically cross-linked cellular hydrogel is obtained.

10. Method of preparing physically cross-linked cellular hydrogels, said method comprising the steps of:

(A) providing a polymer capable of being physically cross-linked;

(B) dissolving said polymer in a material selected from the group consisting essentially of:
(i) a single solvent for the polyvinyl alcohol and,
(ii) a mixture of solvents for the polyvinyl alcohol, to form a solution;

(C) mixing the solution formed in (B) with a material selected from the group consisting essentially of:

(i) a surface active agent and,
(ii) a mixture of surface active agents, and frothing said mixture;
(D) cooling the frothed mixture from (C) to a temperature at which the polymer will undergo physical cross-linking;
(E) submersing the mixture from (D) into a bath consisting essentially of a material selected from the group consisting of:
(i) a solvent at low temperature for the polyvinyl alcohol,
(ii) a non-solvent for the polyvinyl alcohol,
(iii) a poor solvent for the polyvinyl alcohol,
(iv) an aqueous solution of a salt,
(v) an aqueous solution of an acid at low temperature, and,
(vi) an aqueous solution of a base, to induce crystallization, gellation, coagulation, or a mixture of crystallization, gellation, or coagulation of said polymer whereby a physically cross-linked cellular polymer is obtained.

11. A method of preparing physically cross-linked cellular hydrogels, said method comprising the steps of:
(A) providing a polymer capable of being physically cross-linked;
(B) dissolving said polymer in a material selected from the group consisting essentially of:
(i) a single solvent for the polyvinyl alcohol and,
(ii) a mixture of solvents for the polyvinyl alcohol, to form a solution;
(C) mixing the solution formed in (B) with a material selected from the group consisting essentially of:
(i) a surface active agent and,
(ii) a mixture of surface active agents, and frothing said mixture;
(D) cooling the frothed mixture from (C) to a temperature at which the polymer will undergo physical cross-linking;
(E) submersing the mixture from (D) into a bath consisting of an aqueous solution of a material selected from the group consisting essentially of:
(i) a salt,
(ii) an acid at low temperature, and,
(iii) a base, to induce crystallization, gellation, coagulation or a mixture of crystallization, gellation or coagulation of said polymer whereby a physically cross-linked cellular polyvinyl alcohol is obtained.

12. A method of preparing physically cross-linked cellular hydrogels, said method comprising the steps of:
(I) providing a polymer capable of being physically cross-linked;
(II) dissolving said polymer in a material selected from the group consisting essentially of:
(a) a single solvent for the polyvinyl alcohol and,
(b) a mixture of solvents for the polyvinyl alcohol, to form a solution;
(III) mixing the solution from (II) with material selected from the group consisting essentially of:
(a) a surface active agent and,
(b) a mixture of surface active agents;
(IV) mixing the solution formed in (III) with a pore forming material consisting essentially of:
(a) a non solvent for the polyvinyl alcohol;
(b) a poor solvent for the polyvinyl alcohol; and dispersing the pore forming material by subjecting the solution to high shear mixing;
(V) providing conditions at which the polymer from (IV) will undergo physical cross-linking;
(VI) bringing the mixture from (V) to about room temperature;
(VII) removing essentially all the solvents by a means which does not significantly affect the cross-linking or pore-forming material,
(VIII) heating the material at an elevated temperature for a period of time from ten seconds to eight hours, and,
(IX) cooling the mixture from (VIII) to about room temperature and removing the pore-forming material by a means which does not significantly affect the cross-linking, whereby a sponge having collapsed walls is obtained.

13. A method of preparing physically cross-linked cellular hydrogels, said method comprising the steps of:
(I) providing a polymer capable of being physically cross-linked;
(II) dissolving said polymer in a material selected from the group consisting essentially of:
(a) a single solvent for the polyvinyl alcohol and,
(b) a mixture of solvents for the polyvinyl alcohol, to form a solution;
(III) mixing the solution from (II) with material selected from the group consisting essentially of:
(a) a surface active agent and,
(b) a mixture of surface active agents;
(IV) mixing the solution formed in (III) with a pore forming material consisting essentially of:
(a) a non-solvent for the polyvinyl alcohol and,
(b) a poor solvent for the polyvinyl alcohol, and dispersing the pore forming material by subjecting the solution to high shear mixing;
(V) providing conditions at which the polymer from (IV) will undergo physical cross-linking;
(VI) bringing the mixture from (V) to about room temperature;
(VII) removing essentially all the solvents by a means which does not significantly affect the cross-linking or pore-forming material,
(VIII) heating the material at an elevated temperature for a period of time from ten seconds to eight hours, and,
(IX) cooling the mixture from (VIII) to about room temperature and removing the pore-forming material by a means which does not significantly affect the cross-linking, whereby a sponge having collapsed walls is obtained.

* * * * *